Figure 1:
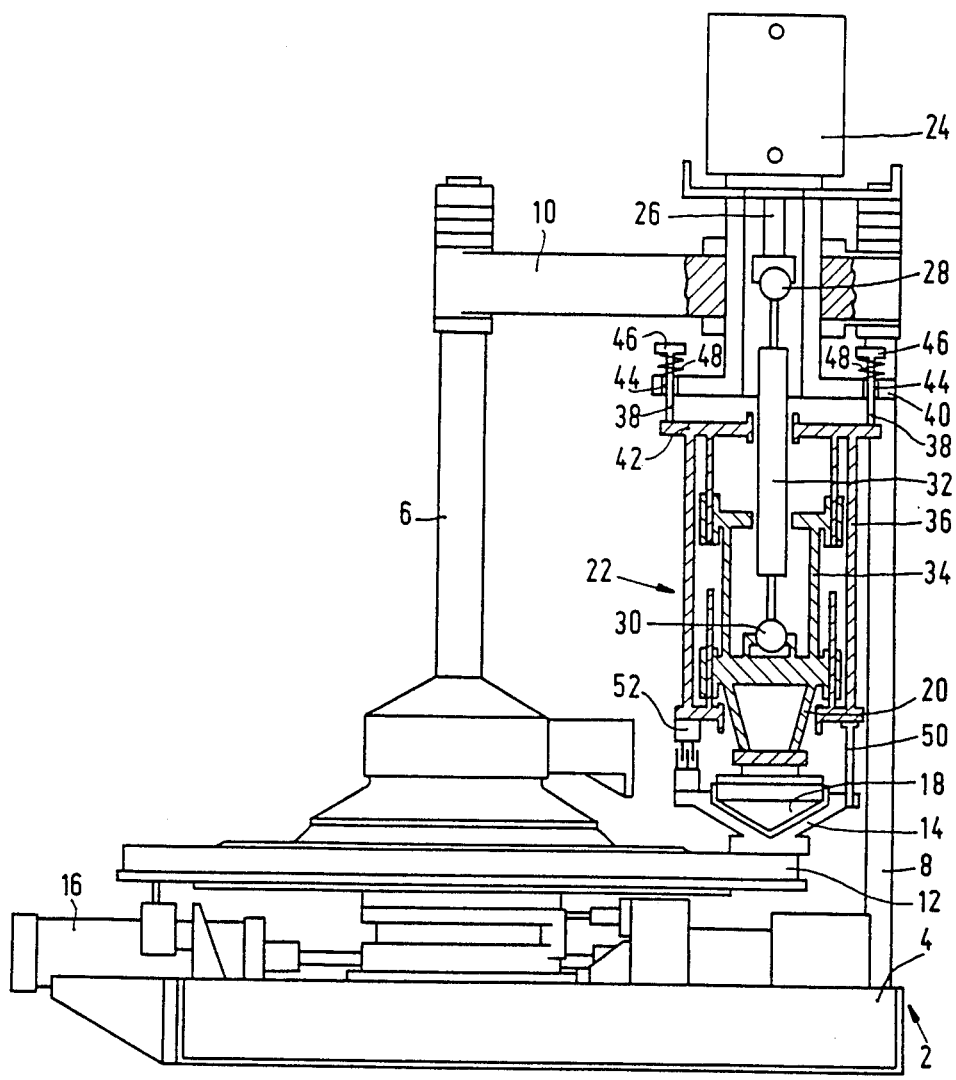

United States Patent [19]
De Willigen et al.

[11] Patent Number: 4,632,689
[45] Date of Patent: Dec. 30, 1986

[54] METHOD OF PRESSING AN ARTICLE OF A THERMOPLASTIC MATERIAL AND APPARATUS FOR MANUFACTURING AN ARTICLE OF A THERMOPLASTIC MATERIAL BY PRESSING

[75] Inventors: Hans C. De Willigen; Willem van der Hoek; Piet C. J. van Rens, all of Eindhoven, Netherlands

[73] Assignee: U.S. Philips Corporation, New York, N.Y.

[21] Appl. No.: 842,737

[22] Filed: Mar. 20, 1986

Related U.S. Application Data

[63] Continuation of Ser. No. 670,530, Nov. 9, 1984, abandoned.

[30] Foreign Application Priority Data

Nov. 10, 1983 [NL] Netherlands ............ 8303854

[51] Int. Cl.⁴ .............................................. C03B 11/16
[52] U.S. Cl. ............................................ 65/78; 65/66; 65/82; 65/308; 65/323
[58] Field of Search ............... 65/66, 78, 82, 307, 65/308, 323

[56] References Cited

U.S. PATENT DOCUMENTS

| | | | |
|---|---|---|---|
| 2,966,006 | 12/1960 | Sherts et al. | 65/323 |
| 3,214,258 | 10/1965 | Martin | 65/66 X |
| 3,416,909 | 12/1968 | Wilcock | 65/309 |

FOREIGN PATENT DOCUMENTS 2057419  4/1981  United Kingdom .............. 65/308

*Primary Examiner*—Arthur Kellogg
*Attorney, Agent, or Firm*—Norman N. Spain

[57] ABSTRACT

The invention relates to a method and apparatus for pressforming an article of a thermoplastic material. In accordance with the method a charge of molten material is deposited in a mould (14) and the central axis of a pressing plunger (18) and the mould (14) are aligned, after high a pressing operation is performed, the alignment being interrupted just before the end of the pressing operation. The apparatus comprises a frame (2), a mould (14) and a plunger (18), which plunger (18) is connected to a guide mechanism (22) which is movably connected to the frame (2) and which can be coupled rigidly to the mould (14) by coupling means (52).

6 Claims, 9 Drawing Figures

METHOD OF PRESSING AN ARTICLE OF A THERMOPLASTIC MATERIAL AND APPARATUS FOR MANUFACTURING AN ARTICLE OF A THERMOPLASTIC MATERIAL BY PRESSING

This is a continuation of application Ser. No. 670,530, filed Nov. 9, 1984, now abandoned.

BACKGROUND OF THE INVENTION

The invention relates to a method of pressing an article of a thermoplastic material in which a charge of molten material is deposited in a mould and the central axis of the mould is brought into alignment with the axis of a pressing plunger, after which the plunger and the mould are moved towards one another to carry out a pressing operation while their axial alignment is maintained.

The invention also relates to apparatus for manufacturing an article of a thermoplastic material by pressing, which apparatus comprises a frame, at least one mould, and a plunger which can cooperate with the mould and which is secured to a plunger support which is supported in a guide mechanism and which is axially movable by a drive means.

Such method and apparatus are disclosed in British Patent Specification 1,105,475.

The known method aims at maintaining the axial alignment of the plunger and the mould throughout the entire pressing operation. In this respect the plunger and the mould (the tools) are not allowed to move freely relative to one another until the plunger and the mould have reached the extreme pressing position and the plunger has been extracted so far from the mould that the plunger is no longer in contact with the pressed article.

As the charge of a thermoplastic material supplied to the mould is generally neither of a wholly symmetrical shape nor situated exactly in the centre of the mould, it frequently happens that towards the end of the pressing operation there is still a substantial flow of material in the space between the plunger and the mould. However, as the thermoplastic material cools its resistance to flow increases. In the known method this gives rise to the problem that at the end of the pressing operation the plunger and the mould are subjected to substantial transverse forces which may lead to uncontrolled stresses in and deformation of the tools. Moreover, the deformation of the tools may give rise to flaws, such as cracks, in the pressed article, in particular after the extreme pressing position of the plunger and the mould has been reached.

The known apparatus is provided with a mechanism, arranged between the plunger and the drive means, for aligning the plunger and the mould during the pressing stoke. The mechanism comprises two paralel plates, of which one is secured to the plunger support and the other to the drive means. A plurality of balls arranged between the plates permits a limited relative movement of the plates. The mould, which can cooperate with the plunger, is provided with an inwardly bevelled annular wall for positioning and guiding the plunger. The plunger is positioned as it moves towards the mould. The plunger first butts against the annular wall and subsequently slides along the bevelled inner side of this wall, the plunger thereby being moved in a transverse direction until the plunger and the mould are aligned.

A disadvantage of the known apparatus is that during the alignment of the plunger and the mould substantial forces occur at the contact surfaces between the plunger and the annular wall of the mould. This may lead to premature wear to the plunger and the mould and hence to a short life of these parts of the apparatus. Another disadvantage is that the annular wall which constantly bears on the mould is subject to substantial temperature variations so that an acurate alignment of the plunger relative to the mould is not possible due to the expansion and contraction of the wall.

SUMMARY OF THE INVENTION

It is the object of the invention to provide a method and apparatus of the kind specified in the opening paragraphs which do not have said disadvantages.

In order to achieve this the method in accordance with the invention is characterized in that the maintenance of the axial alignment of the plunger and the mould is interrupted towards the end of the pressing operation, but before the extreme pressing position of the plunger and mould is reached.

During pressing of an article the charge of a thermoplastic material spreads outwardly from the centre of the mould in the space between the plunger and the mould. It then frequently happens that shortly before the end of the pressing operation the thermoplastic material has not yet been distributed perfectly uniformly and symmetrically though the temperature of the material has already dropped substantially. As already stated, this gives rise to a number of undesired effects when the known method is used.

When using the method in accordance with the invention the plunger and the mould are allowed, towards the end of the pressing operation to assume a position, which is also determined by the article being formed. This means that during the last stage of the pressing operation the axis of the plunger and the axis of the mould need not be in exact alignment.

An advantage of the method in accordance with the invention is that the forces exerted on the tools required for carrying out the method remain under control and that the pressed article exhibits no damage as a result of the pressing process, although stringent requirements may be imposed on the dimensional accuracy.

Suitably, the method in accordance with the invention is characterized in that after the extreme pressing position has been reached the axial alignment of the plunger and the mould is secured after which the plunger and the mould are moved away from each other.

After the extreme pressing position has been reached, the plunger and the mould are moved away from each other to allow the article thus formed to be removed from the mould. In the extreme pressing position the position of the plunger and the mould relative to each other is defined inter alia by the article formed. In the method in accordance with the invention the plunger and mould are moved away from each other along their respective axes. This has the advantage that the plunger as it moves away from the article cannot perform an undesired displacement relative to the mould, which prevents the article from being damaged by the plunger as it is withdrawn.

The apparatus in accordance with the invention is characterized in that the guide mechanism is movably connected to the frame and the apparatus comprises coupling means for selectively rigidly coupling the guide mechanism to the mould in a coaxial position permitting a slight lateral adjustment of the plunger relative to the mould.

In the apparatus in accordance with the invention the plunger is positioned relative to the mould before the plunger is moved towards the mould. For this purpose the guide mechanism, which supports the plunger support with the plunger, is connected to the frame in a resilient and movable manner, allowing the plunger to be brought into the correct position relative to the mould. The guide mechanism may be, for example, suspended by cables, elastic cords or rods which are secured to the frame. It is obvious that other constructions may be used.

After the plunger and the mould have been aligned the guide mechanism is rigidly coupled to the mould by the coupling means. The coupling means may be means which are known per se, such as for example a multiple-plate coupling.

An advantage of the apparatus in accordance with the invention is that the alignment of the plunger and the mould and the movement of the plunger and the mould towards one another are two independent operations. As a result of this both the positioning and the subsequent pressing operation can be effected very accurately.

Another advantage is, that the rigid connection between the guide mechanism and the mould results in a very stiff construction in which the plunger can be moved in an axial direction in a well-defined manner.

A preferred embodiment of the invention is characterized in that the apparatus comprises positioning means for positioning the guide mechanism and the mould relative to each other.

The positioning means serve for the alignment of the plunger and the mould, the axis of the plunger being brought into parallel relationship and subsequently into alignment with the axis of the mould. For this purpose the positioning means may comprise a plurality of spacer pins for cooperation with locating surfaces on the mould and the guide mechanism and a plurality of centering pins which are engageable with centering holes in the apparatus. The spacer pins and the centering pins can be moved in a manner known per se. For this purpose for example pneumatic, hydraulic or electrical drive means may be employed.

An advantage of this embodiment is that the plunger and the mould are brought into the correct position relative to each other in a rapid, reliable and accurate manner before pressing begins.

Another preferred embodiment of the invention is characterized in that the guide mechanism is of telescopic construction and comprises a first tubular body and a second tubular body, the first tubular body being connected to the plunger support and being axially slidable in the second tubular body which is resiliently suspended from the frame and which can be coupled to the mould.

An advantage of this embodiment is that a guide mechanism is obtained which has a substantial transverse stiffness and is consequently very suitable for taking up the forces produced during the pressing operation.

A further embodiment of the invention is characterized in that the plunger support is secured to the drive means by means of two ball joints, which are connected to each other by a plunger rod.

An advantage of this embodiment is that the mechanism connecting the drive means and the plunger support to each other has a high degree of axial stiffness while allowing transverse displacements of the plunger support relative to the drive means. Such displacements are important during positioning of the plunger but in particular during the last stage of the pressing operation.

It is to be noted that the invention also relates to an apparatus in which the positions of the plunger and the mould are interchanged, i.e. in which the mould is supported in a guide mechanism and is axially movable by a drive means.

Figure 2:
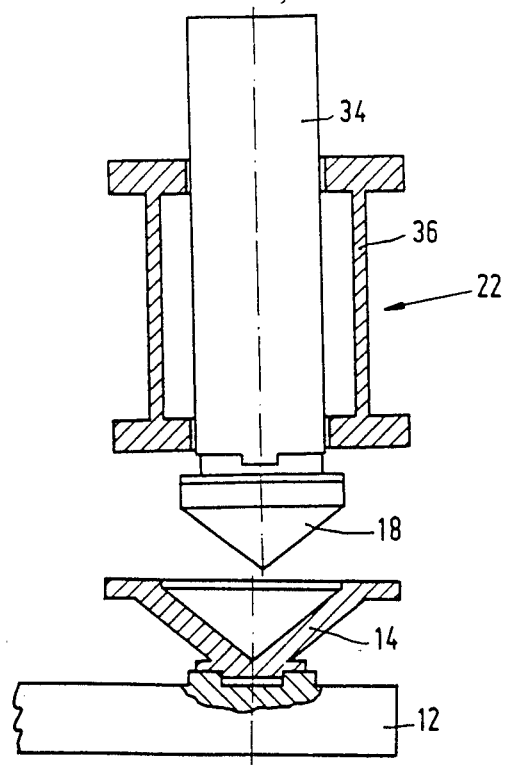
Figure 3:
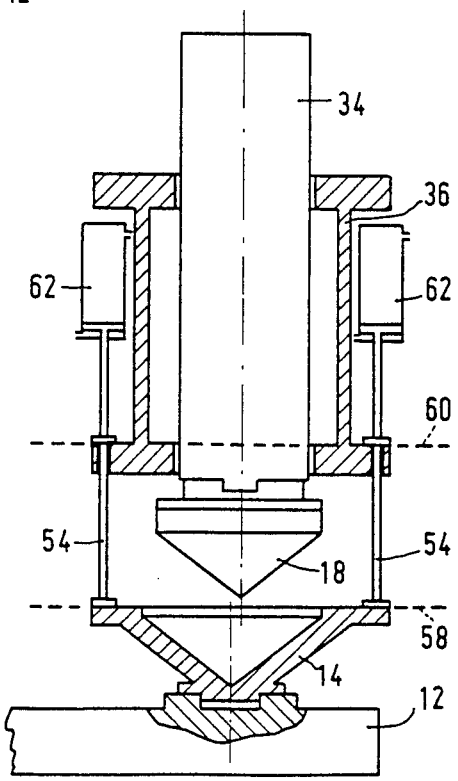
Figure 4:
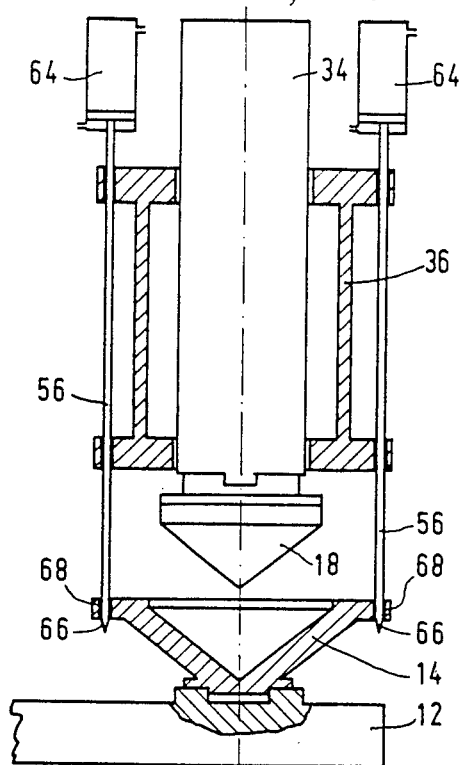
Figure 5:
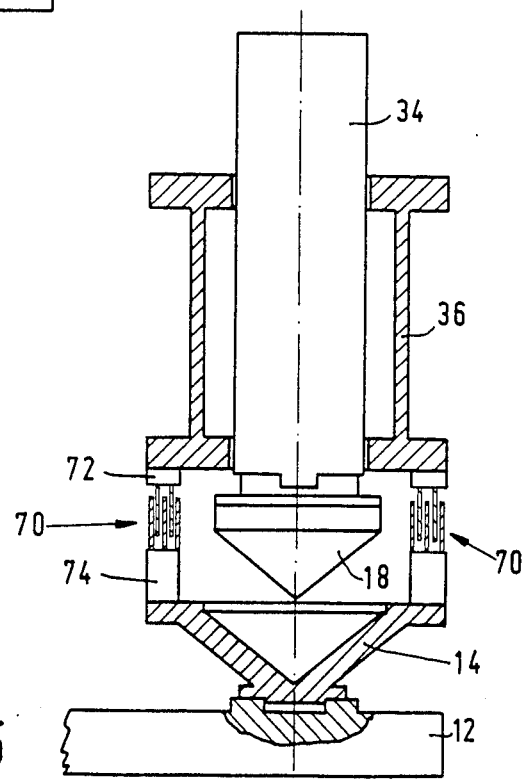
Figure 6:
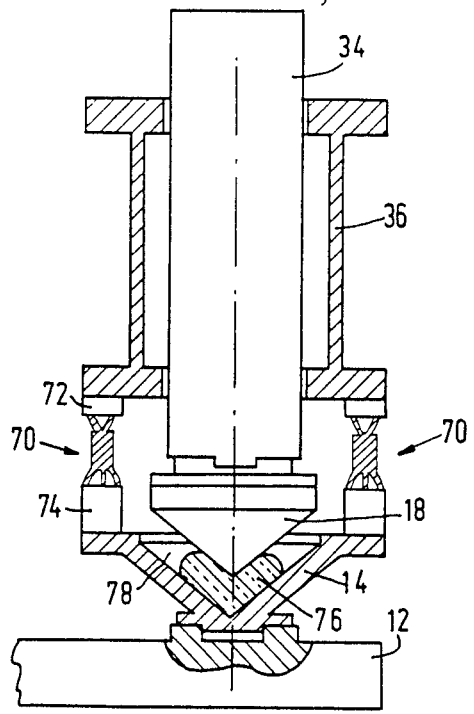
Figure 7:
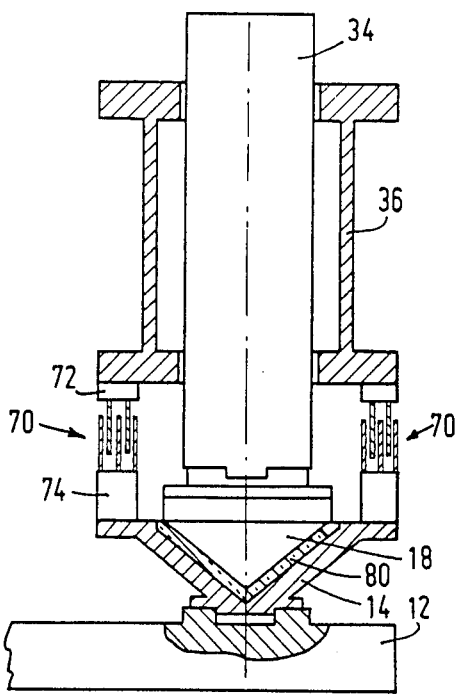
Figure 8:
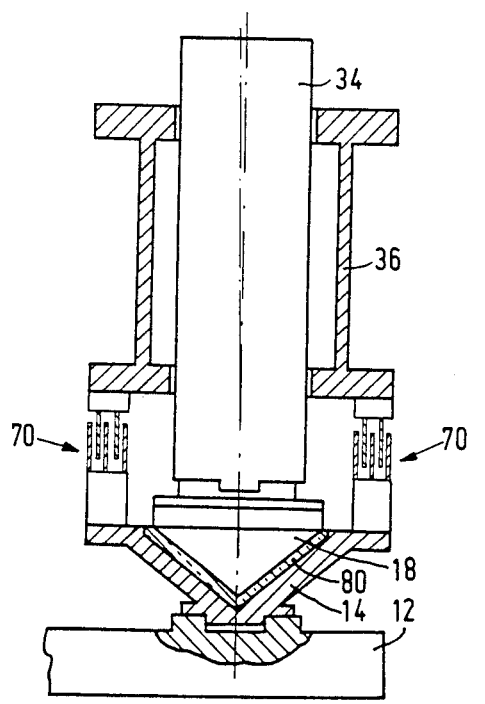
Figure 9:
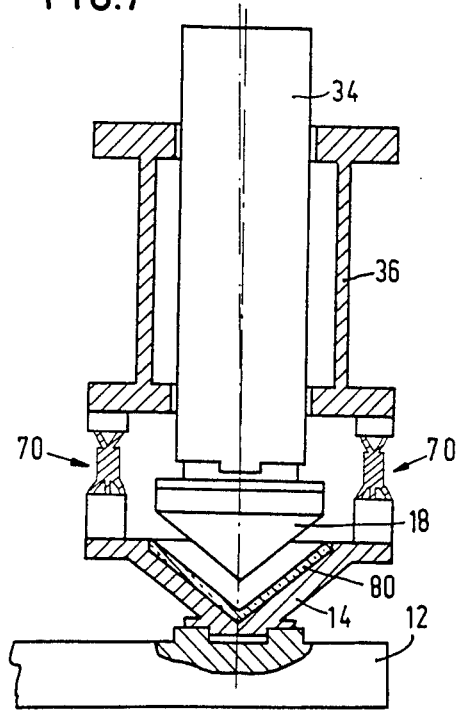

The invention will now be described in more detail, by way of example, with reference to the drawings, in which FIG. 1 is a partly sectional side view of an apparatus according to an embodiment of the invention, FIG. 2 shows schematically the plunger and the mould of this apparatus in arbitrary positions of misalignment relative to each other, FIG. 3 shows the plunger and the mould in a partly aligned position relative to each other, FIG. 4 shows the plunger and the mould, axially aligned with each other, FIG. 5 shows the plunger and the mould, coupled to each other, FIG. 6 shows the plunger and the mould during pressing of a charge of a thermoplastic material, FIG. 7 shows the plunger and the mould just before completion of the pressing operation, FIG. 8 shows the plunger and the mould in the extreme pressing position, and FIG. 9 the position of the plunger and the mould after the plunger has been withdrawn from the mould containing the formed article.

The apparatus in accordance with the invention shown in FIG. 1 is particularly suitable for pressing hollow glass articles such as faceplates and cones for television picture tubes, from charges of glass. The apparatus comprises a frame 2, which comprises a bed plate 4, a main column 6, two columns 8, of which only one column is shown in the drawing, and a bridge 10 interconnecting the columns 6 and 8.

A rotary table 12 carrying eleven equispaced moulds 14, of which only one mould is shown, is journalled on the main column 6. The rotary table 12 is rotated stepwise by a pneumatic drive 16, so that the moulds 14 are successively positioned underneath a pressing plunger 18. The plunger 18 is situated between the main column 6 and the columns 8 and is secured to a plunger support 20 which is supported in a guide mechanism 22 and is driven by a drive means 24 mounted on the frame 2. In the present example the drive means 24 comprises a compressed-air cylinder and a piston. It is obvious that different drive means may be employed. The drive means 24 is connected to the plunger support 20 by means of a connecting rod 26, two ball-joints 28 and 30, and a plunger rod 32.

The guide mechanism 22 is of telescopic construction and comprises a first tubular body 34 and a second tubular body 36. The first tubular body 34 is axially slidable in the second tubular body 36 and is secured to the plunger support 20. The second tubular body 36 is secured to a mounting plate 40 of the frame 2 by means of a resilient suspension system comprising rods 38, which are secured to the upper end 42 of the second tubular body 36 and which project through holes 44 in the mounting plate 40. On their free upper ends the rods 38 are each provided with a head 46 with which the rods 38 bear on springs 48 which are supported on the mounting plate 40. This suspension system allows an axial, a radial and a tangential displacement and a tilting movement of the guide mechanism 22. Other suspension systems, for example those using cables or elastic cords, are also suitable for this purpose.

The apparatus in accordance with this embodiment of the invention further comprises positioning means 50 and coupling means 52. The means 50 and coupling means 52. The means 50 and 52 and the performance of the method in accordance with the invention using the above apparatus will now be described in more detail with reference to FIGS. 2 to 9.

FIGS. 2 to 9 schematically show different positions of the plunger relative to the mould. The features illustrated in FIGS. 2 to 9 are used in the apparatus shown in FIG. 1 but may alternatively be used in other embodiments of the invention.

After a stepwise rotation of the rotary table 12 a situation as shown in FIG. 2 may be obtained. In this situation a mould 14 is disposed underneath the plunger 18 and the central axes of the plunger 18 and the mould 14 are in arbitrary positions of misalignment relative to each other. For the sake of clarity it is emphasized that the mould 14 is arranged on the rotary table 12 and the plunger 18 is supported so as to be axially movable in the resiliently suspended guide mechanism 22 comprising the first tubular body 34 and the second tubular body 36.

In accordance with the invention method the plunger 18 and the mould 14 must be brought into axial alignment with each other. For this purpose the apparatus comprises the positioning means 50. In the present example the positioning means 50 comprise three spacer pins 54 of equal length, two of such pins being shown in FIG. 3, and three centering pins 56, two of which are shown in FIG. 4, which centering pins are engageable with centering holes 68 in the mould 14.

FIG. 3 shows how the central axis of the plunger 18 is brought into a position parallel to the central axis of the mould 14 by means of the spacer pins 54. For this purpose the mould 14 and the second tubular body 36 are provided with locating surfaces 58 and 60 respectively. The locating surfaces 58 and 60 are oriented in such a way that the axis of the mould 14 extends perpendicularly to the locating surface 58, and the axis of the second tubular body 36, and consequently the axis of the plunger 18, extends perpendicularly to the locating surface 60. The spacer pins 54 are mounted in the second tubular body 36 and are slidable by, for example, a pneumatic drive means 62. When the spacer pins 54 are in engagement with the locating surfaces 58 and 60 these surfaces are parallel to each other and hence, the axis of the plunger 18 extends parallel to the axis of the mould 14.

Subsequently, the plunger 18 is positioned so that the central axis of the plunger 18 is disposed in line with the central axis of the mould 14. For this purpose the centring pins 56 are used in a manner as illustrated in FIG. 4. The centring pins 56 are mounted in the second tubular body 36 and are axially movable by, for example, pneumatic drive means 64. The centring pins 56 have conical end portions 66. When the centring pins 56 are engaged in the centring holes 68, the axis of the plunger 18 is aligned accurately with the axis of the mould 14.

In accordance with the inventive method the plunger 18 and the mould 14 are subsequently retained in this axial alignment. For this purpose the coupling means 52 is employed. In FIG. 5 the coupling means 52 comprises four multi-plate couplings 70, which are known per se, which couplings, as well known in the art, may be magnetically, hydraulically, or pneumatically activated and of which only two couplings are shown in the drawing. Such a coupling 70 comprises two coupling sections 72 and 74 which are each provided with a plurality of parallel slightly flexible plates, the plates of one coupling section interdigitating with the plates of the other coupling section. In the present version the coupling section 72 is secured to the second tubular body 36 and the coupling section 74 is secured to the mould 14. When the couplings 70 are actuated the second tubular body 36 is rigidly coupled to the mould 14 and the axial alignment of the plunger 18 and the mould 14 cannot thereafter be disturbed.

Subsequently, whilst maintaining the rigid coupling between the second tubular body 36 and the mould 14, the plunger 18 is moved towards the mould 14, the first tubular body 34 sliding axially in the second tubular body 36, as is shown in FIG. 6. In the meantime a charge of glass 76 has been deposited in the centre of the mould 14. When the plunger 18 has reached the charge of glass 76 the actual pressing operation begins. The charge of glass 76 is pressed away from the centre of the mould 14 in all directions inside the continuously diminishing space 78 between the plunger 18 and the mould 14. Generally, the space 78 is not filled perfectly uniformly by the cooling glass. In order to prevent the apparatus from being subjected to very large forces at the end of the pressing operation before the extreme pressing position of the plunger 18 and the mould 14 is reached the rigid coupling 70 between the second tubular body 36 and the mould 14 is released. This situation is shown in FIG. 7. In the final stage of the pressing operation the plunger 18 can tilt slightly and/or move radially out of alignment with mould 14, for example as shown in FIG. 8. The plunger 18 assumes an optimum position relative to the nearly formed glass article 80, so that the strongly cooled glass only has to be subjected to small displacements to reach the extreme pressing position. It has been found that as a result of the method used dimensional deviations of the article if any are very small. When the apparatus described is used the dimensional deviations are smaller than 0.1 mm.

Before the plunger 18 is withdrawn from the mould 14 the multi-plate couplings 70 are reactivated, so that the second tubular body 36 and the mould 14 are coupled to each other in the final position. The plunger 18 can now be withdrawn without the risk of damage to the article 80 thus formed, which the article 80 may be removed from the mould 14.

What is claimed is:

1. A method of molding an article of a thermoplastic material in which a charge of molten material is deposited in mold and the central axis of the mold is brought into alignment with the central axis of a pressing plunger, after which the plunger and the mold are moved towards each other to carry out a pressing operation while the axial alignment of the mold and the plunger is maintained, characterized in that maintenance of the axial alignment of the plunger and the mold is interrupted towards the end of the pressing, but before the extreme pressing position of the plunger and mold is reached, sufficiently to permit a slight lateral adjustment of the plunger relative to the mold.

2. A method as claimed in claim 1, characterized in that after the extreme pressing position has been reached the axial alignment of the plunger and the mould is secured, after which the plunger and the mould are moved away from each other.

3. An apparatus for manufacturing an article of a thermoplastic material by pressing, in a mold, a charge of thermoplastic material in molten form, which apparatus comprises at least one mold, a plunger for cooperating with said mold and which is secured to a plunger support supported in a guide mechanism axially movable by a drive means and a frame supporting said mold and said guide mechanism, characterized in that said guide mechanism is movably connected to said frame and said apparatus comprises coupling means for rigidly coaxially coupling the guide mechanism to the mold while bringing the plunger to the mold until just before the extreme pressing position of the plunger and the mold is reached, said coupling means then permitting a slight lateral adjustment of the guide mechanism relative to the mold.

4. An apparatus as claimed in claim 3, characterized in that the apparatus comprises positioning means for positioning the guide mechanism and the mould relative to each other.

5. An apparatus as claimed in claim 3, characterized in that the guide mechanism is of telescopic construction and comprises a first tubular body and a second tubular body, the first tubular body being connected to the plunger support and being axially slidable in the second tubular body which is resiliently suspended from the frame and which can be coupled to the mould.

6. An apparatus as claimed in claim 3, characterized in that the plunger support is secured to the drive means by means of two ball joints, which are connected to each other by a plunger rod.

* * * * *

UNITED STATES PATENT AND TRADEMARK OFFICE
CERTIFICATE OF CORRECTION

PATENT NO. : 4,632,689

DATED : December 30, 1986

INVENTOR(S) : HANS C. DE WILLIGEN ET AL

It is certified that error appears in the above-identified patent and that said Letters Patent is hereby corrected as shown below:

Column 6, line 60, after "in" insert --a--.

Column 6, line 65, after "that" insert --the--.

Signed and Sealed this

Eighth Day of December, 1987

Attest:

DONALD J. QUIGG

*Attesting Officer*     *Commissioner of Patents and Trademarks*